US006317655B1

(12) United States Patent
Khots et al.

(10) Patent No.: US 6,317,655 B1
(45) Date of Patent: Nov. 13, 2001

(54) METHOD AND APPARATUS FOR ESTIMATING A SURGE LIMIT LINE FOR CONFIGURING AN ANTISURGE CONTROLLER

(75) Inventors: Boris S. Khots, West Des Moines; Leonid Shcharansky, Clive; German D. Lakov, West Des Moines, all of IA (US)

(73) Assignee: Compressor Controls Corporation, Des Moines, IA (US)

( * ) Notice: Subject to any disclaimer, the term of this patent is extended or adjusted under 35 U.S.C. 154(b) by 0 days.

(21) Appl. No.: 09/248,944

(22) Filed: Feb. 12, 1999

(51) Int. Cl.[7] .......... G01M 1/38
(52) U.S. Cl. .......... 700/275; 701/100
(58) Field of Search .......... 700/275, 287; 415/1, 27; 60/39.01; 701/100

(56) References Cited

U.S. PATENT DOCUMENTS

| | | | | |
|---|---|---|---|---|
| 5,508,943 | * | 4/1996 | Batson et al. | 700/287 |
| 5,752,378 | * | 5/1998 | Mirsky et al. | 60/39.03 |
| 5,879,133 | * | 3/1999 | Mirsky et al. | 417/46 |
| 5,908,462 | * | 6/1999 | Batson | 701/100 |
| 5,951,240 | * | 9/1999 | Mirsky et al. | 415/1 |
| 5,967,742 | * | 10/1999 | Mirsky et al. | 415/1 |

* cited by examiner

*Primary Examiner*—Paul P. Gordon
*Assistant Examiner*—Zoila Cabrera
(74) *Attorney, Agent, or Firm*—Henderson & Sturm LLP

(57) ABSTRACT

The exactness of surge-limit information facilitates the determination of how safely a turbocompressor can operate as well as determining the size of the operational envelope in which a compressor can function with a closed antisurge valve. Furthermore, in order to accurately describe the complete interface between stable and unstable operation, a sufficient number of test points must be found. Consequently, if a turbocompressor operates within the broad ranges of rotational speed or guide vane position or both of them, the unit must be repeatedly tested using different values of process variables; as a result, each test leads the turbocompressor into surge which can be detrimental because of strong dynamic loading. For that reason, this invention describes a technique employed during turbocompressor testing (either without generating surge or with a minimum number of surges) for defining both the shape and the location of a turbocompressor's surge limit. The procedure is performed by (1) testing a turbocompressor, (2) measuring appropriate values associated with the turbocompressor's operation and then storing the accumulated data, (3) curve fitting the data, (4) estimating the surge point based on curve fit, and (5) repeating step 3 for multiple rotational speed and guide vane positioning. These data are accumulated in the form of calculated performance-map coordinates. The surge reference is defined by the maxima of the curve fits at multiple constant equivalent speed and guide vane position values.

16 Claims, 4 Drawing Sheets

METHOD AND APPARATUS FOR ESTIMATING A SURGE LIMIT LINE FOR CONFIGURING AN ANTISURGE CONTROLLER

TECHNICAL FIELD

This invention relates generally to a method and apparatus for antisurge control of a turbocompressor by experimentally defining a surge reference that approximates a surge limit. More specifically, it relates to a method that accurately estimates both the shape and the location of the surge limit. The technique is employed during compressor testing (either without generating surge or with a minimum number of surges), and it uses the resultant test data to configure an antisurge controller.

BACKGROUND ART

To provide and sustain efficient, economical control of a turbocompressor, it is necessary to know both the location and the shape of its surge limit line, as plotted on a performance map. The exactness of this surgelimit information determines how safely a compressor can operate, and it also helps to determine the size of the compressor's operational envelope. Therefore, the more accurately the surge-limit characteristics are estimated, the larger is the region (operational envelope) in which a compressor can function with a closed antisurge valve. However, during normal operation, compressor-system performance characteristics often change significantly due to inherent influences, such as mechanical degradation of its flow-through parts and defects in its seal system that, in turn, cause the location and shape of the surge limit line, as well as the performance limits, to vary.

Establishing the largest possible operational envelope (with the antisurge valve closed) requires compressor testing to identify the actual characteristics of a surge limit, and then using this information to configuring an antisurge controller. A sufficient number of test points must be found to accurately describe the complete interface between stable and unstable operation. Consequently, if a compressor operates within the broad ranges of rotational speed or guide vane position or both of them, the unit must be repeatedly tested using different values of these process variables; as a result, each test leads the compressor into surge which can be detrimental because of strong dynamic loading.

DISCLOSURE OF THE INVENTION

A purpose of this invention is to improve upon the prior art by eliminating (or decreasing to a minimum) occurrences of surge and the resulting detrimental dynamic loading when testing a turbocompressor for the purpose of defining both the shape and the location of its surge limit. This curtailment of surge and its adverse effects is achieved while accurately estimating surge points by using characteristic curves corresponding to constant parameters (equivalent speed, guide vane angle, or other parameters if they exist). The tested characteristic curve is curve fitted using tested data points with calculated performance-map coordinates. The maximum of the curve then determines the surge point.

The curve fit, called the first function, is defined and checked for accuracy at each incremental step toward surge and is developed in the following manner:

A compressor's operating point is moved toward surge by increasing the resistance of its compression system while maintaining parameters (such as, equivalent speed and guide vane angle) constant.

During compressor testing, process variables are measured from which, generally, unmeasurable variables and parameters are usually calculated.

Values of the calculated process variables and the calculated parameters (used as performance-map coordinates and parameters required to estimate where the compressor will surge) are stored in an estimating module.

Accumulated data are fitted by a curve (the first function) that is updated after every incremental move toward surge.

A maximum for the calculated function is found by computing a zero of the function's first derivative.

A surge reference is then defined, based upon (1) the location of the first function's maximum or (2) a predetermined relationship between its coordinates and the first function's maximum.

After repeating the test using different operating parameters, multiple maxima are known. The surge reference is defined by curves (called second functions) fitting these maxima.

To prevent compressor surge, a surge control line should be defined on a performance map (at a preset distance from the surge reference line) and used by an antisurge controller to modulate an antisurge valve. To help confirm that the surge control line's location is accurately chosen, it should be reached (during testing) by the compressor's operating point without encountering surge.

Should the shape and location of a surge limit line depend on guide vane position or other process parameters, testing is carried out for the full range of these parameter values.

Implementing this invention provides a nearly surge-free method for defining a surge reference because the probability of surge under these conditions is minimized. If there is a sudden surge, testing is stopped and the point at which surge occurs is recorded.

BEST MODE FOR CARRYING OUT THE INVENTION

The technique of defining a surge reference starts when the turbocompressor is (1) operating with a gas of fixed or known composition, (2) running at minimum operating rotational speed, and (3) functioning with a minimum opening of the guide vanes and with a maximum opening of the antisurge valve. Rotational speed and the positions of the antisurge valve and of the guide vanes are manipulated for the purpose of estimating (with certain precision) the shape and location of a surge limit line.

Figure 1:
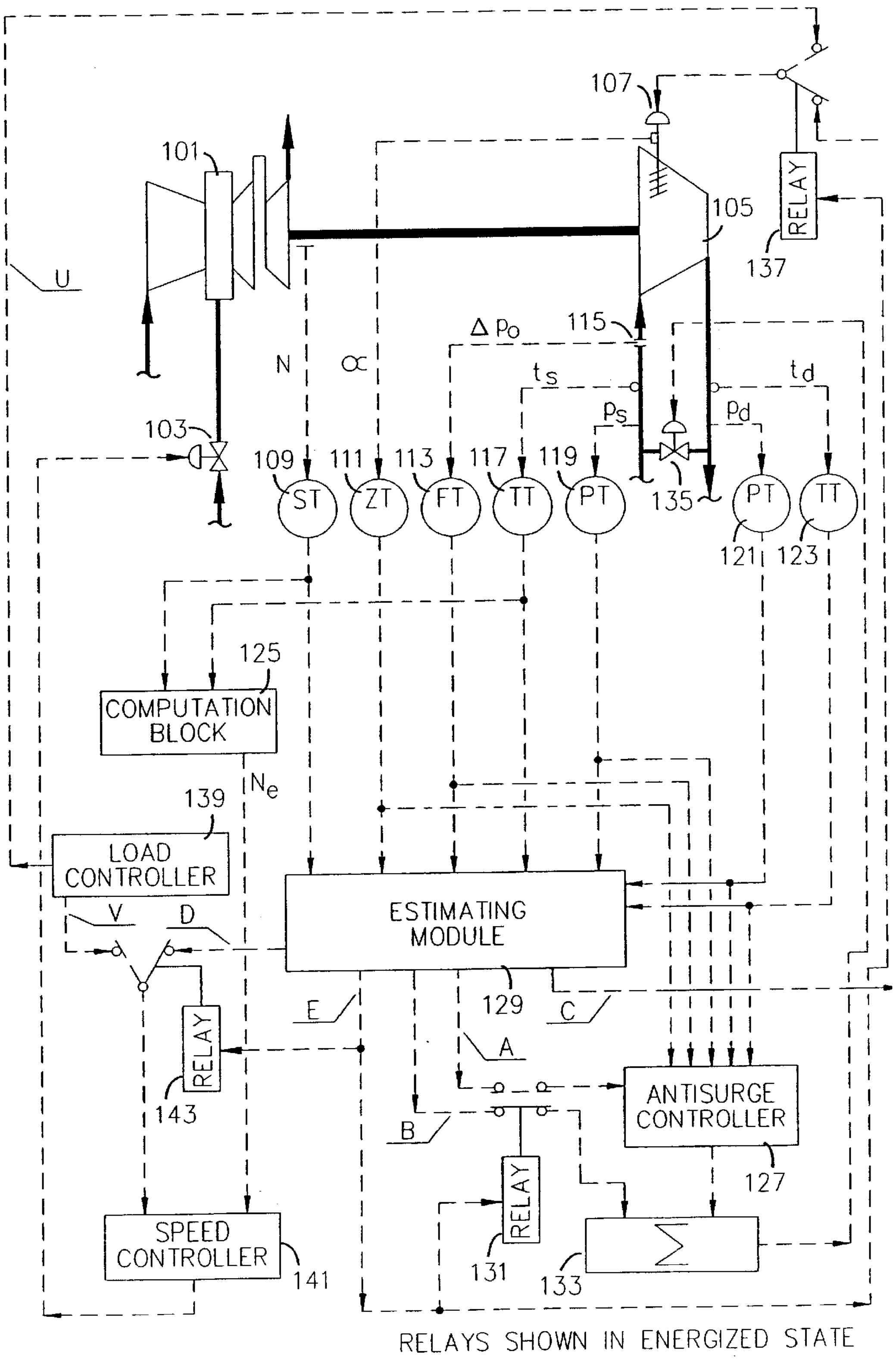
FIG. 1 shows a process and instrumentation diagram of an automatic control system for a turbocompressor with a gas-turbine drive, including an estimating module used for defining a surge reference.

FIG. 1 shows a process and instrumentation diagram of a turbomachinery train comprising a driver (gas turbine) 101 with a fuel control valve 103, and a turbocompressor 105 incorporating inlet guide vanes 107. The train is also equipped with seven transmitters: rotational speed (ST-N)

109, inlet guide van position (ZT-$\alpha$) 111, differential pressure (FT-$\Delta p_o$) 113 for a flow measuring device 115, suction temperature (TT-$t_s$) 117, suction pressure (PT-$p_s$) 119, discharge pressure (PT-$p_d$) 121, and discharge temperature (TT-$t_d$) 123. These transmitters input to an equivalent speed ($N_e$) computation block 125, to a Proportional-Integral (PI) antisurge controller 127, and to an estimating module 129 having five output signals (A, B, C, D, E):

- Signal A, by way of a de-energized first relay 131, inputs to the antisurge controller 127.
- Signal B, by way of an energized first relay 131, together with a signal from the antisurge controller 127, inputs to a summing block 133 whose signal modulates an antisurge valve 135.
- Signal C controls the inlet guide vanes 107 by way of an energized second relay 137 that also connects (when in a de-energized state) the guide vanes 107 to signal U of a compressor load controller 139.
- Signal D inputs to a speed controller 141 by way of an energized third relay 143 that also connects (when in a de-energized state) the speed controller 141 to signal V of the compressor load controller 139. When inputted by either the D or the V signal, together with the computation block's 125 signal ($N_e$), the speed controller 141 modulates the fuel control valve 103.
- Signal E activates the three relays 131, 137, 143 (shown in an energized state in FIG. 1).

Figure 2:
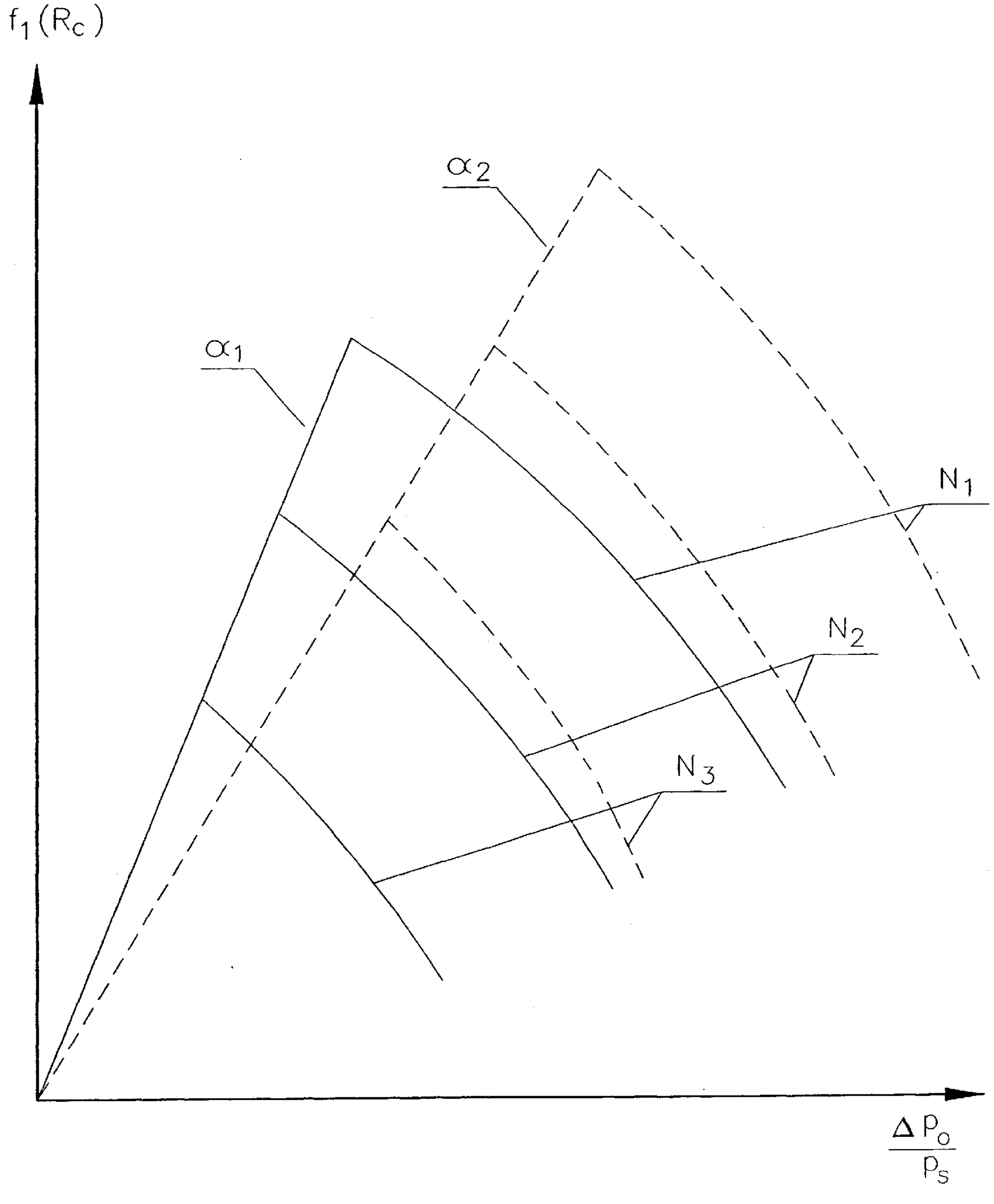
FIG. 2 shows a performance map with variable speed and variable inlet guide vanes.

FIG. 2 shows a performance map with variable speed and variable inlet guide vanes. Curves designated as $N_1$, $N_2$, and $N_3$ are performance curves corresponding to constant equivalent speed values, whereas the curves designated as $\alpha_1$ and $\alpha_2$ correspond to locations of the surge limit line at positions $\alpha_1$ and $\alpha_2$ of the guide vanes.

Figure 3:
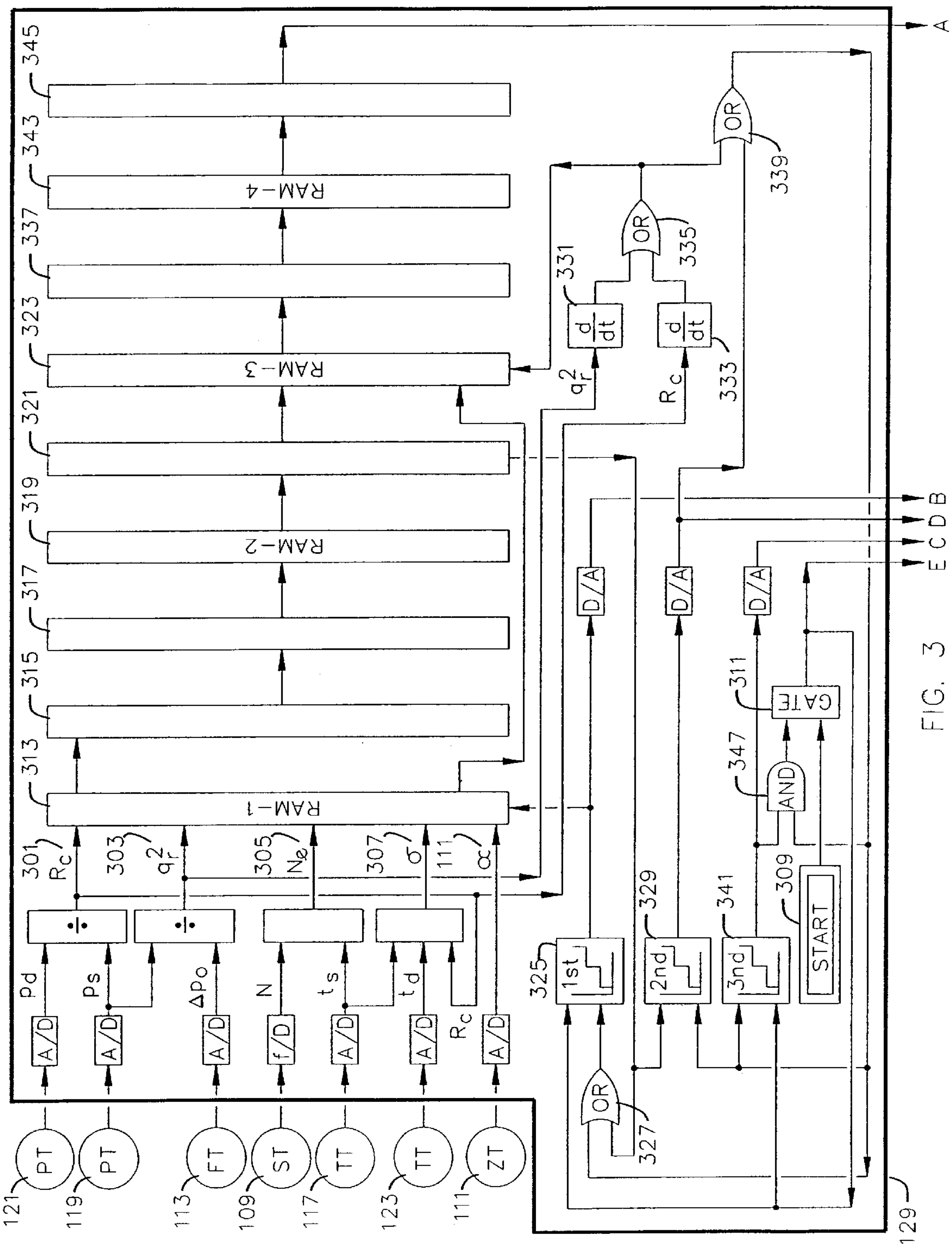
FIG. 3 shows a functional schematic of an estimating module used to define a surge reference.

FIG. 3 represents a functional schematic of the estimating module 129 (see FIG. 1) with RAM-1 313 being inputted by five digitized-data values $R_c$ 301, $q^{r2}$ 303, $N_e$ 305, $\sigma$ 307, and $\alpha$ 111; all derived from the following process variables $P_d$, $P_s$, $\Delta p_o$, N, $T_s$, $T_d$, and $\alpha$:

$$R_c = \frac{p_d}{p_s} = \text{pressure ratio}$$

$$q_r = \sqrt{\frac{\Delta p_o}{p_s}} = \text{reduced flow rate}$$

$$N_e = \frac{N}{\sqrt{(ZRT)_s}} = \text{equivalent speed}$$

$$\sigma = \frac{\ln[(ZT)_d/(ZT)_s]}{\ln R_c} = \text{polytropic head exponent}$$

$\alpha$ = guide vane position and where $Z$ = compressibility factor $R$ = gas constant $T_s = t_s + 273.15$ = absolute suction temperature $T_d = t_d + 273.15$ = absolute discharge temperature These values are then computed and subsequently used to develop the estimating module's output signals A, B, C, D, and E.

The following section describes the intrinsic operation of the estimating module 129, depicted in FIG. 3, and the ensuing development of its five output signals. The process is set in motion by putting the turbomachinery train in Run mode with the activation of a START signal 309 inputted to a transmission gate 311 from which signal E originates. Signal E then activates the three relays 131, 137, 143 shown in FIG. 1.

Figure 4:
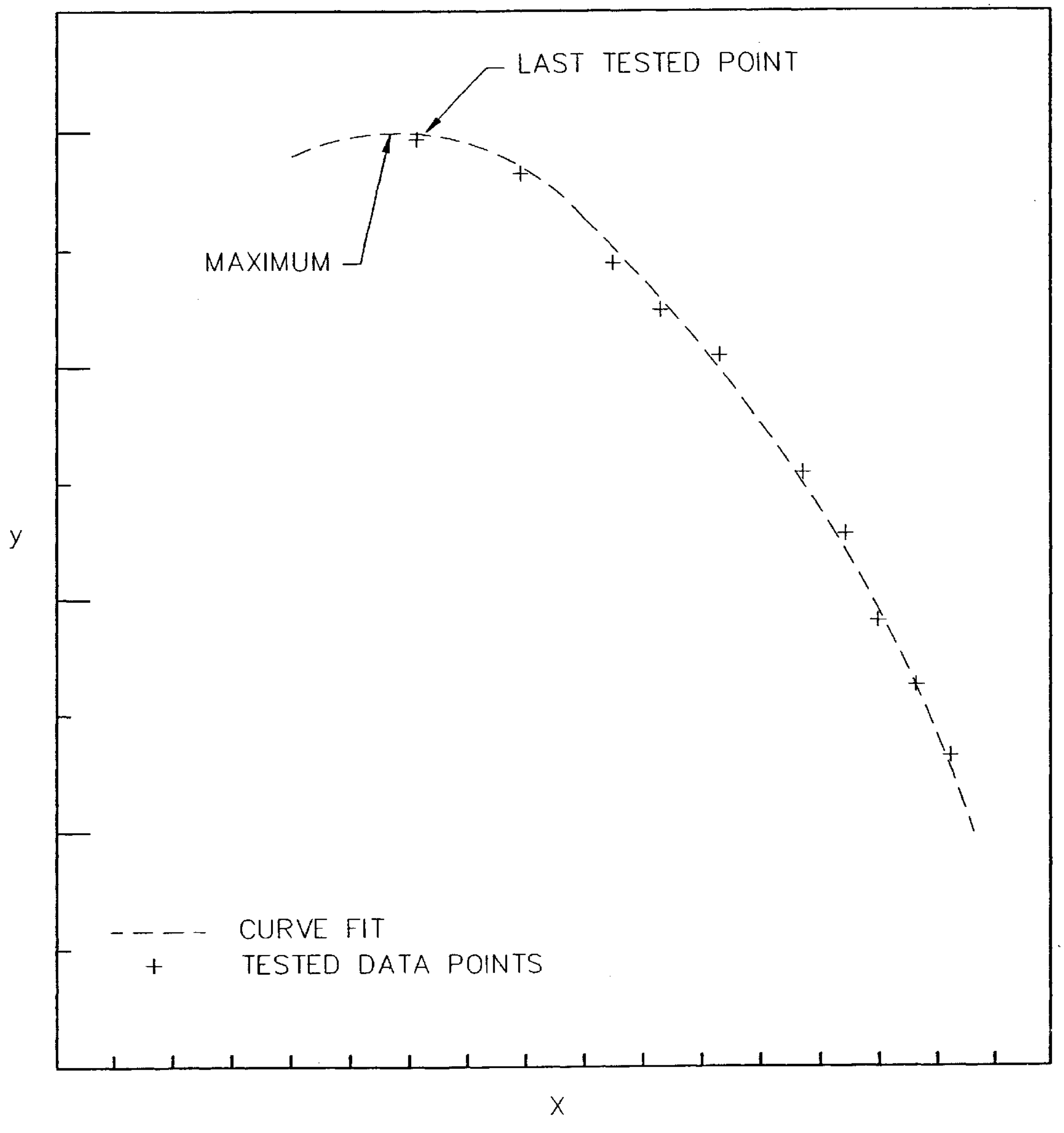
FIG. 4 shows a tested characteristic curve used to determine a surge point.

RAM-1 313 data are processed in a curve-fitting block 315 where coefficients are calculated for defining a function (the first function for surge limit definition) like the polynomial $y_1(X)=\alpha_o X^n+\alpha_1 X^{n-1}+ \ldots +\alpha_n$, where $y=(R_c^{\alpha}-1)/\alpha$ and $X=q_r^2$. Both y and X are performance-map coordinates depicted in FIG. 4 where test points are curve fitted to define a first function, and the curve's maximum determines the surge point; that is, the point where the compressor pressure ratio cannot be maintained as a function of the compressor reduced flow rate.

Coefficients $\alpha_0, \alpha_1, \ldots, \alpha_n$ are defined by minimizing a measure of the error, between the data points and the function; for example, the quadratic form $$A_n = \sum_{i=1}^{L} [y_a(X_i) - y_1(X_i)]^2$$

where $y_a$ is an actual value of y, i is the number of a data point, and L is the tot umber of data points used in defining the curve fit. An order n of the function $y_1(X)$ is defined from the condition $A_n=A_{n,min}$. Also, the function $y_1(X)$ is based on data within the range $X_{min} \leqq X \leqq X_{max}$ and $2 \leqq n \leqq 2N$ where N is the number of compression stages; and $X_{min}<X_{max}$ are preset constant values. Furthermore, $y_1(X)$ must have a local maximum within this range, and the second derivative must satisfy $d^2y_1(X)/dX^2 \leqq 0$ on $[X_{min}, X_{max}]$.

If the X(t) function (t is time) oscillates, only minimum X(t) function values may be utilized for defining the $y_1(X)$ curve fit.

The constructed function $y_1(X)$ is inputted to a calculation block 317 where (according to the rules for determining extrema) the coordinates $y=Y_{j,max}$ and $X=X_{j,min}$ are found. These coordinates locate the maximum of the function $y_{1,j}(X)$ where j is the number of the first function corresponding to the current equivalent speed value ($N_{e,j}$), and also corresponding to a current inlet guide vane position ($\alpha$) as performance-map parameters. Function defining begins very far from surge, and it repeats after storing each newly tested operating point as well as the calculated data of maxima in RAM-2 319.

The convergence of this process is determined by a convergence test block 321 according to the following conditions:

$$|X_{j,k,min}-X_{j,k-1,min}| \leqq \delta_1$$

$$|Y_{1,j,k,max}-Y_{1,j,k-1,max}| \leqq \delta_2$$

where the values $\delta_1$ and $\delta_2$ are preset tolerances. When the above conditions are fulfilled, this step of the test is finished and the calculated values $y_1=y_{1j,max}$ and $X=X_{j,min}$ are stored in RAM-3 323.

The test may be concluded at a preset distance from the estimated surge limit line (surge reference), and the distance may be used as the antisurge controller's safety margin that defines the surge control line set for antisurge valve opening; however, this preset distance may also be less than the safety margin.

The surge control line location may be set by the following equation:

$$S = \frac{K(R_c^{\sigma} - 1)}{\sigma(\Delta p_o / p_s)} + b = 1$$

where

S=surge control variable

K, b=gain and bias of the antisurge controller and $$K = \frac{(\Delta p_o / p_s)_{\min}}{\left(\frac{R_c^{\sigma} - 1}{\sigma}\right)_{\max}}$$

When the values $Y_{1,j,max}$ and $X_{j,min}$ transfer to RAM-3, a discrete output signal from the convergence test block 321 transfers simultaneously to a first step-function source 325 (by way of an OR operation 327) and to a second step-function source 329. In response to these two step-function operations 325, 329 (also identified as signals B and D, respectively), the antisurge valve 135 fully opens, and the speed controller 141 receives a new set point with which to continue testing. However, if surge occurs during testing, it will be detected by the reduced flow rate ($q^{r2}$) derivative block 331 or the pressure ratio ($R_c$) derivative block 333, or both of them. The output of either derivative block 331, 333 will trigger an OR operation signal 335 directly to RAM-3, in which the coordinates of the compressor's operating point (corresponding to the current testing step) will be stored.

Based on data stored in RAM-3, a second curve-fitting block 337 defines the surge reference for the current position of the guide vanes 107 ($\alpha$ is a performance-map parameter) as the following polynomial function:

$$Y_2 = b_0 X^m + b_1 X^{m-1} + \ldots + b_m$$

which is the second function for surge reference definition, and where coefficients $b_0, b_1, \ldots, b_m$ are determined in the same manner as the first polynomial function and $1 \leqq m \leqq m_{max}-1$, where $m_{max}$ is the number of first functions $y_1(X)$. Again, $y=(R_c^{\alpha}-1/\alpha$ and $X=q_r^2$.

If variable guide vanes are present (after testing has been completed using the current value of $\alpha_1$), the second step-function's 329 output signal transmits to an OR operation 339 which inputs back to the second step-function source 329 whose output (signal D) decreases to the minimal equivalent speed. This same OR signal 339 transfers to a third step-function source 341 whose output (signal C) switches to the next $\alpha_2$ value of guide vane position.

From testing within the full range of equivalent speed ($N_e$) values and guide vane ($\alpha$) positions, the data are now accumulated in RAM-4 343. With this information, an identification block 345 constructs the function $y_3(X)=y_2(X)$ $f(\alpha)$ which is the third function for surge reference definition (signal A), and where $f(\alpha)$ may be a polynomial function, such as $$f(\alpha) = \frac{y_3(X)}{y_2(X)} = c_0\alpha^r + c_1\alpha^{r-1} + \cdots + c_r$$

where coefficients $c_0, c_1, \ldots, C_r$ are determined in the same manner as the second polynomial functions and $1 \leqq r \leqq r_{max}{}^{r-1}$, where $r_{max}$ is the number of second functions $Y_2(X)$.

After completing the testing procedure within the full range of guide vane ($\alpha$) positions, an output signal is transmitted from an AND operation 347 to the transmission gate 311, causing the logic level of signal E to stop testing.

At this stage, the procedure for compressor testing is completed on the basis of (1) the outputs of the three step-signal sources 325, 329, 341 are reset to their original values; (2) all three relays 131, 137, 143 revert to a de-energized state; (3) inputs to the guide vanes 107 and to the speed controller 141 are again connected (respectively) with the U and V signals of the load controller 139; and (4) signal A is reconnected to the antisurge controller 127.

Because of this testing procedure, the surge reference is defined as a function of reduced flow squared ($q_r^2$) and the position of the guide vanes ($\alpha$) within their full-range values.

The surge reference may not be a set of maxima of the first functions; but instead, it may be a set of values of the first functions in some constant relationship with these maxima; for example, $$\frac{R_c^{\sigma} - 1}{\sigma \frac{\Delta p_o}{p_s}} \bigg/ \frac{(R_c^{\sigma} - 1)_{\max}}{\sigma\left(\frac{\Delta p_o}{p_s}\right)_{\min}} = Const$$

Although this invention is described using a first function of pressure ratio and reduced flow, other parameters can be used that describe the operation of the turbocompressor. The same is true for parameters used in the second and third functions.

Obviously, many modifications and variations of the present invention are possible in light of the above teachings. It is, therefore, to be understood that within the scope of the appended claims, the invention may be practiced otherwise than as specifically described.

We claim:

1. A method for estimating, by way of a test, a location of surge of a turbocompressor on its performance map, the compressor being instrumented with appropriate transmitters and having a variable resistance, the method comprising:

(a) increasing the compressor's variable resistance to move a compressor's operating point closer to surge in a stable operating zone;

(b) measuring appropriate values associated with the compressor's operation, and calculating a succession of the compressor's operating points in performance-map coordinates, (c) defining a first function based on the succession of operating points;

(d) determining a location of the first function's maximum; and (e) utilizing the first function's maximum to estimate a location of surge of the compressor.

2. The method of claim 1, wherein the estimated location of surge is used in an antisurge control system to prevent surge in the compressor.

3. The method of claim 1, wherein the first function is defined as a polynomial of order n.

4. The method of claim 3, wherein n is an integer value, $2 \leqq n \leqq 2N$, where N is a number of compression stages of the compressor.

5. The method of claim 3, wherein polynomial coefficients are determined by a least-squares fit; that is, minimizing an error, $$A_n = \sum_{i=1}^{L} [y_a(X_i) - y_1(X_i)]^2.$$

6. The method of claim 4, wherein a particular value of n is chosen by determining a minimum value of $$A_n = \sum_{i=1}^{L} [y_a(X_i) - y_1(X_i)]^2.$$

7. The method of claim 3, wherein the first function, $y_1(X)$, must have a maximum and satisfy a criterion, $$\frac{d^2}{dx^2} y_1(X) \leq 0 \quad \text{on} \quad X_{min} \leq X \leq X_{max}.$$

8. The method of claim 1, wherein the estimated location of surge is constructed for a full range of variable parameters and used in an antisurge control system to prevent surge in the compressor.

9. An apparatus for estimating, by way of a test, a location of surge of a turbocompressor on its performance map, the compressor being instrumented with appropriate transmitters and having a variable resistance, the apparatus comprising:

(a) means for increasing the compressor's variable resistance to move a compressor's operating point closer to surge in a stable operating zone;

(b) means for measuring appropriate values associated with the compressor's operation, and calculating a succession of the compressor's operating points in performance-map coordinates;

(c) means for defining a first function based on the succession of operating points;

(d) means for determining a location of the first function's maximum; and (e) means for utilizing the first function's maximum to estimate a location of surge of the compressor.

10. The apparatus of claim 9, wherein the estimated location of surge is used in an antisurge control system to prevent surge in the compressor.

11. The apparatus of claim 9, wherein the first function is defined as a polynomial of order n.

12. The apparatus of claim 11, wherein n is an integer value, $2 \leqq n \leqq 2N$, where N is a number of compression stages of the compressor.

13. The apparatus of claim 11, wherein polynomial coefficients are determined by a least-squares fit; that is, minimizing an error, $$A_n = \sum_{i=1}^{L} [y_a(X_i) - y_1(X_i)]^2.$$

14. The apparatus of claim 12, wherein a particular value of n is chosen by determining a minimum value of $$A_n = \sum_{i=1}^{L} [y_a(X_i) - y_1(X_i)]^2.$$

15. The apparatus of claim 11, wherein the first function, $y_1(X)$, must have a maximum and satisfy a criterion, $$\frac{d^2}{dx^2} y_1(X) \leq 0 \quad \text{on} \quad X_{min} \leq X \leq X_{max}.$$

16. The apparatus of claim 9, wherein the estimated location of surge is constructed for a full range of variable parameters and used in an antisurge control system to prevent surge in the compressor.

* * * * *